United States Patent
Uphus

(10) Patent No.: US 6,974,310 B2
(45) Date of Patent: Dec. 13, 2005

(54) SCREW EXTRUDER AND GEAR PUMP ARRANGEMENT FOR HIGHLY VISCOUS MEDIA

(75) Inventor: Reinhard Uphus, Hannover (DE)

(73) Assignee: Berstorff GmbH, Hannover (DE)

( * ) Notice: Subject to any disclaimer, the term of this patent is extended or adjusted under 35 U.S.C. 154(b) by 252 days.

(21) Appl. No.: 10/381,353

(22) PCT Filed: Sep. 28, 2001

(86) PCT No.: PCT/DE01/03801

§ 371 (c)(1),
(2), (4) Date: Mar. 26, 2003

(87) PCT Pub. No.: WO02/26471

PCT Pub. Date: Apr. 4, 2002

(65) Prior Publication Data

US 2004/0009076 A1 Jan. 15, 2004

(30) Foreign Application Priority Data

Sep. 28, 2000 (DE) .......................... 100 49 730
Nov. 21, 2000 (DE) .......................... 100 58 918

(51) Int. Cl.$^7$ ........................... F04B 23/12; F04B 23/14
(52) U.S. Cl. ..................................... 417/205; 418/61.1
(58) Field of Search ..................... 417/205; 418/61.1, 418/196

(56) References Cited

U.S. PATENT DOCUMENTS

| | | | | | |
|---|---|---|---|---|---|
| 1,635,373 A | * | 7/1927 | Lofholm | ...................... | 417/205 |
| 3,606,600 A | * | 9/1971 | Pollman | ...................... | 418/61.1 |
| 4,249,750 A | * | 2/1981 | Kantner | ...................... | 418/61.1 |
| 5,267,837 A | * | 12/1993 | Mowli | ........................ | 417/205 |
| 5,655,891 A | * | 8/1997 | Deal et al. | .................. | 417/205 |

* cited by examiner

Primary Examiner—Michael Koczo, Jr.
(74) Attorney, Agent, or Firm—Cohen, Pontani, Lieberman & Pavane

(57) ABSTRACT

A screw extruder and gear pump arrangement for highly viscous media includes a screw shaft and a gear pump operatively coupled to the screw shaft. A planet carrier is operatively engaged with at least one rotatably mounted planet gear, a first functional element that is cooperatively engaged with planet gear as a sun wheel, and a second functional element that is cooperatively engaged with the planet gear as an outer ring. One of the first functional element or the second functional element includes gear teeth for meshing with the planet gear and the other includes a sealing region for bearing in a sliding and sealing manner over part of the circumference and length of the planet gear. A pump casing surrounds the planet carrier.

25 Claims, 10 Drawing Sheets

SCREW EXTRUDER AND GEAR PUMP ARRANGEMENT FOR HIGHLY VISCOUS MEDIA

CROSS REFERENCE TO RELATED APPLICATIONS

This a U.S. national stage of application No. PCT/DE01/03801, filed on Sep. 28, 2001. Priority is claimed and to the following applications: DE 100 49 730.6 filed Sep. 28, 2000 in Germany, and DE 100 58 918.9 filed Nov. 21, 2000 in Germany.

BACKGROUND OF THE INVENTION

1. Field of the Invention

The invention relates to a screw extruder and gear pump arrangement for highly viscous media.

2. Description of the Prior Art

Published German Patent Application DE-A 21 00 403 discloses a hydraulic pump which, in the form of an epicyclic gearbox, is equipped with a sun gear, a plurality of planet gears rotatably mounted on a planet carrier and an internal gear, all the gears having teeth. Between the planet gears and the internal gear, which intermesh, and also between the planet gears and the sun gear, which likewise intermesh, suction and pressure chamber elements are formed alternately, being sealed off by arcuate dividing walls of the planet carrier, which otherwise fills the interspaces between the gears. The flat sides of the planet gears, of the internal gear and of the sun gear in each case bear in a leakproof manner on two flat casing walls arranged at a distance from each other, which are provided with wall apertures which connect the individual suction and pressure chamber elements between the gears with a suction chamber provided with a hydraulic feed line and functioning as a collector and, respectively, with a pressure chamber provided with a hydraulic line and likewise functioning as a collector.

Gear pumps of this type, i.e., a planet gear pump, the planet carrier is preferably fixed, while the sun gear and the internal gear revolve. Such a pump is basically unsuitable for delivering highly viscous media, since it needs to be fed with a considerable pilot pressure and thus would not be self cleaning.

A similar gear pump, which is disclosed by DE 36 31 527 C1, permits its delivery rate to be varied independently of speed. The pump again has toothed planet gears, a planet carrier and a toothed internal gear and also a toothed sun gear, which are housed in a pump casing. In order to change the delivery rate, independently of the speed of the driven sun gear, optionally the revolving movement of the planet carrier or the rotational movement of the internal gear can be stopped. The planet carrier is provided with an inlet sealing wall having a plurality of inlet openings and an outlet sealing wall spaced apart axially therefrom and having a plurality of outlet openings. The sealing walls are mounted in a rotatable and sealed manner in the cylindrical pump casing. A suction chamber is arranged in the pump casing upstream of the inlet sealing wall in the delivery direction, and a pressure chamber is arranged downstream of the inlet sealing wall in the delivery direction. The suction chamber in each case extends through the inlet openings into individual suction chamber elements, that extend to the outlet sealing wall, while the pressure chamber extends through the outlet openings into individual pressure chamber elements that extend to the inlet sealing wall.

The suction chamber elements and the pressure chamber elements are arranged in the interspaces between a planet gear, the internal gear and the sun gear and are sealed off from one another by the inlet and the outlet sealing wall and by parts, filling the interspaces, of the solidly designed planet carrier arranged between the inlet and the outlet sealing wall. The feed line for the medium to be delivered runs in the form of a longitudinal bore, which changes into a transverse bore within the axis of rotation of the planet carrier led through the wall of the pump casing, while the discharge line for the delivered medium is guided in a corresponding way through the axis of rotation of the sun gear. Because of the small diameters of the bores and the small cross-sectional areas of the inlet and outlet openings, such a pump would be unsuitable for delivering highly viscous media and would not be self cleaning.

Another gear pump operating as a planet gear pump is disclosed by U.S. Pat. No. 3,870,437. In this case, the column to be delivered is in each case enclosed in the interspace between the sun gear and the internal gear and two immediately adjacent planet gears. In order to enlarge the size of this interspace continuously in the region of the suction point (inflow region) during the revolution of the planet gears in order to produce the pumping action, and in order to reduce it continuously in the region of the pressure zone (outflow region), this pump has flexibly deformable gears. For example, the internal gear and the driven sun gear can be arranged eccentrically in relation to one another, and flexible planet gears can be used, which are able to adapt to the different gap widths between internal gear and sun gear by deformation (ovality).

A common feature of these known planet gear pumps is that not only the planet gears but also the internal gear and the sun gear in each case have teeth, which intermesh with one another with the effect of a revolving gear mechanism.

When processing plastic melts or rubber mixtures, gear pumps have hitherto been usual, operating with the effect of a spur gear mechanism and generally being connected to a screw extruder. As a rule, such gear pumps have a drive which is separate from the drive of the extruder shaft or shafts. Such an extruder is disclosed by EP 0 508 080 A2, for example. Thus, an extruder screw delivers the material to be extruded directly into the pocket area of the gear pump, which has two intermeshing spur gears. This type of gear pump is not self cleaning. Therefore, when the respective material to be processed is changed, such pumps require complicated dismantling and cleaning work in order not to accept any quality losses following the material change.

EP 0 564 884 A1 discloses a double screw extruder whose screw shafts in a section to increase the pressure of the melt to be processed are in each case fitted with one of the two spur gears of a gear pump, so that the gears are driven directly by the screw shafts. By means of two sealing walls at the end, that is to say running at right angles to the longitudinal axis of the screw shafts, which are provided with a passage window for the melt to the inlet side and to the outlet side, suction chamber and pressure chamber are divided from each other. This gear pump is not self cleaning either. Its delivery volume cannot be changed independently of the rotational speed of the screw shafts.

Finally, EP 0 642 913 A1 discloses a single-screw extruder which has a gear pump in a spur gear mechanism design prior to its last screw section. One of the two spur gears of the gear pump is fixed directly to the screw shaft of the screw extruder and is driven by said shaft. The extruder casing has a lateral bulge, in which the second spur gear of the gear pump is mounted. In each case a sealing wall bears on the flat sides of the spur gears, being mounted with a form fit in the casing of the extruder. The sealing walls or the extruder casing are in each case provided with a passage window on the suction side and pressure side for the extruded material. No self cleaning is ensured in this known extruder either.

SUMMARY OF THE INVENTION

It is an object of the present invention to propose a screw extruder and gear pump arrangement which, in a particular way, is suitable for processing highly viscous materials and operates largely in a self-cleaning manner.

The present invention provides a screw extruder and gear pump arrangement in which the gear pump is constnucted in principle so as to correspond with an epicyclic gearbox and, in a particular way, is suitable for delivering highly viscous media such as plastic melts and rubber mixtures. The present invention has the advantage of extensive self cleaning, since the medium to be delivered can be fed in without a significant pilot pressure.

The present invention is based on a planet gear pump which has a planet carrier which is fitted with at least one planet gear rotatably mounted in the planet carrier. In addition, this planet gear pump has two further functional elements which interact with the at least one planet gear with the effect of a sun gear and an internal gear respectively. Furthermore, a pump casing, which surrounds the planet carrier with the planet gears and the two aforementioned functional elements from the outside, and an inlet and an outlet sealing wall. The inlet sealing wall is firmly fixed to the planet carrier so as to rotate with it and has at least one inlet opening for the medium to be delivered. In a corresponding way, the outlet sealing wall is firmly connected to the planet carrier so as to rotate with it and is provided with at least one outlet opening for the medium to be delivered.

In addition, this gear pump has a suction chamber and a pressure chamber, which are enclosed by the pump casing and sealed off from one another, the suction chamber being arranged upstream of the inlet sealing wall in the delivery direction and extending through the at least one inlet opening into at least one suction chamber element along the at least one planet gear as far as the outlet sealing wall, and the pressure chamber being arranged behind the outlet sealing wall in the delivery direction.

According to the present invention, a screw extruder and gear pump arrangement for highly viscous media includes a screw shaft and a gear pump operatively coupled to the screw shaft. The arrangement further includes a planet carrier that is operatively engaged with at least one rotatably mounted planet gear and a first functional element that is cooperatively engaged with a planet gear an outer as a sun wheel, a second functional element that is cooperatively engaged with the planet gear as an outer ring. One of the first functional element or the second functional element includes gear teeth for meshing with the planet gear and the other includes a sealing region for bearing in a sliding and sealing manner over part of the circumference and length of the planet gear. The sealing region is rotatably engaged with the planet carrier and includes a smooth wall. A pump casing surrounds the planet carrier. An inlet sealing wall is firmly connected to the planet carrier and an inlet opening is disposed in the inlet sealing wall for passing the media to be delivered. An outlet sealing wall is firmly connected to the planet carrier and an outlet opening is disposed in the outlet sealing wall for passing the media to be delivered. A suction chamber is enclosed by the pump casing and is arranged upstream of the inlet sealing wall in a delivery direction and extends through the inlet opening into a suction chamber element along the planet gear to the outlet sealing wall. A pressure chamber is enclosed by the pump casing and the pressure chamber is arranged downstream of the outlet sealing wall in the delivery direction. A dividing wall for seals off the suction chamber and the pressure chamber from one another.

In an expedient embodiment, provision is made for the pressure chamber to extend through the at least one outlet opening into at least one pressure chamber element along the at least one planet gear as far as the inlet sealing wall. Thus, the pressure chamber element and the suction chamber element are opposite each other with respect to the planet gear.

In another embodiment, provision is made for the volume of the respective pressure chamber element to be minimized and preferably to become zero. Thus, the dividing wall bears in a leakproof manner on the teeth of the planet gear over the entire axial length of the respective planet gear and over the entire area of its circumference. In this design, particularly effective self cleaning of the gear pump is ensured.

The functional element which is toothed in the corresponding way to that of the at least one planet gear and meshes with the latter is preferably an internal gear as part of the outer ring. Since this can be arranged to be stationary, it is expediently made in one piece with the pump casing or at least mounted in a rotationally fixed manner in the pump casing surrounding the internal gear. In this case, the planet carrier revolves with the functional part corresponding to the sun wheel and is preferably formed in one piece with the latter. In this case, there is therefore no toothed sun gear, as in a conventional planet gear mechanism. In this case, the at least one planet gear therefore does not mesh with teeth on such a sun gear either, but moves in a sliding and sealed manner in the at least one sealing region of the sun wheel, i.e., the functional part otherwise functioning as a sun gear.

It is of course possible to select a converse arrangement as well, in which a toothed sun gear is used, while the functional part functioning as an outer ring has no teeth but is provided with the at least one sealing region. In this case, the outer ring can remain stationary like the planet carrier. Because of the simpler construction, however, the aforementioned solution with a toothed internal gear and with an untoothed "sun wheel" is preferred.

A plurality of planet gears, dividing walls, inlet and outlet openings are expediently provided, that is to say in each case at least two, preferably in each case at least four. The toothing of the planet gears and of the functional part meshing therewith (preferably therefore the internal gear) can have straight teeth, but is preferably designed with oblique teeth. This permits particularly uniform delivery from the planet gear pump.

The planet gears and the functonal part meshing therewith can also be designed with herringbone teeth. In this case, however, dismantling is made more difficult. However, by means of a divided design, for example of the internal gear, dismantling may still be provided even under these more difficult conditions.

In a further expedient embodiment, the present invention provides for the dividing walls to run in a spiral shape in the actual direction in a manner corresponding to that of the oblique toothings. In this case, it is recommended to form the dividing walls in one piece with the functional element having the at least one sealing region, that is to say preferably with the "sun wheel". In addition, in this case the planet carrier will expediently be formed in one piece with the "sun wheel".

The planet gears will expediently be mounted in the inlet sealing wall and the outlet sealing wall, so that these are part of the planet carrier. Of course, a separate formation of these components is also possible. In order that the planet gears can easily be assembled and dismantled, it is advantageous to form only one of the two sealing walls, preferably the inlet sealing wall, in one piece with the planet carrier and to leave the other sealing wall as a separate component.

In order to be able to accommodate the gear pump easily in the casing of a screw extruder and to ensure that disassembly is simple, it is recommended to configure the outer diameter of the inlet sealing wall to be unequal to, that is to say preferably smaller than the outer diameter of the outlet sealing wall. As a result, the gear pump, which is generally connected to a screw extruder at the delivery end of the latter, can easily be pulled out of the casing at the top end of the extruder.

In accordance with one embodiment, in order to permit a change in the delivery volume of the gear pump during operation, the planet carrier, together with the functional part corresponding to the sun wheel and the inlet and the outlet sealing wall, are arranged in the pump casing such that they can be displaced axially by a displacement travel with respect to the internal gear on the outer ring. As a result, the length of the tooth engagement between the internal gear and the planet gears, and therefore the displacement volume of the teeth, can be varied. In order that no undesired leaks arise between the suction chamber and the pressure chamber, it is recommended that the inlet sealing wall, which is mounted in a sliding and sealing manner in the pump casing and moves into the toothed area of the internal gear when it is displaced, to have an axial thickness (that is to say as viewed in the displacement direction) which is greater than the maximum displacement travel w. As a result, the seal between the pump casing and the inlet sealing wall is maintained unchanged. However, provision can also be made to set a certain leakage between pressure chamber and suction chamber by means of a slight displacement, in order to restrict the delivery capacity of the pump.

As distinct from known planet gear pumps, restricting the delivery capacity during operation is possible without a continually required second drive for one of the functional elements (outer ring or sun wheel), since a drive with a power consumption which is to this extent extremely small is only required for the short time of the axial displacement of the gear pump. As a result of the ability to adjust the delivery capacity of the gear pump, adaptation to the processing of different materials is possible.

From a production point of view, it may be recommendable for the planet gears and/or the outer ring or sun wheel meshing therewith to be of soft elastic design in the region near to the surface of the toothing. Thus, as compared with teeth manufactured to exact tolerances, in production terms relatively coarsely toleranced metallic basic tooth bodies can be produced, which have smaller dimensions than the intended dimensions of the finished toothing and are subsequently provided with an elastic covering, in particular a covering of rubber or a thermoplastic elastomer. Since this covering has excellent elasticity characteristics, the requirements on the toothing produced in this way are also lower than in the case of purely metallic toothing. Oversizes can be compensated for to the same extent by deformation. By means of a rubber covering with a slight oversize, the teeth cavities, e.g., of the internal gear can be cleaned out completely.

In one embodiment, the toothing of the internal gear or the planet gears are designed to be alternately or in sections with teeth of different height, i.e. utilizing a planet gear in which half the teeth have a normal size and the other half of the teeth have a reduced size, the two tooth sizes alternating continuously over the circumference. If the pump has a plurality of planet gears, different planet gears can also be used, i.e. planet gears with a normal tooth height and other planet gears with a reduced tooth height. The effect which can be produced therewith is to be seen in the fact that, as a result of partly reduced tooth height, it is possible to carry out compaction of the material which is contained in the tooth gaps of the opposing gear interacting with the respective gear. Only when it encounters a tooth of full design would the compacted material then be forced out of the tooth gap and delivered.

In the case of a planet gear with a continuously reduced tooth height, therefore, the material located in the tooth gaps in the internal gear will first of all be compressed and in each case pressed out of the tooth gaps, subjected to expansion and shear flows only by the following planet gear, whose teeth are of full design. In the case of a gear pump having four planet gears, in each case two opposite planet gears are formed with a reduced teeth height and the two other opposite planet gears are formed with a normal tooth height. The positive flows present in the gear pump promote continuous homogenization and mixing (for example fillers) of the material to be processed.

The tooth geometry of the toothing of planet gears and internal gear is in principle any desired. It is merely necessary to ensure that the teeth of one gear engage in the tooth gaps in the respective other gear in such a way that there is a sealed sliding contact with the two teeth bounding the respective tooth gaps of the other gear.

One or more gear pumps in the design of an epicyclic gear mechanism, in particular gear pumps, are used in a screw extruder for delivering free-flowing media such as in particular plastic melts and rubber mixtures, it being possible for the screw extruder to have one or else more screw shafts and for the screw shaft or shafts in each case to be coupled mechanically to the drive of the gear pump, so that it does not require a separate pump drive. No dedicated control for the drive of the gear pump is needed either.

The pump casing is normally connected directly to the casing of the screw extruder or is preferably a constituent part of the extruder casing.

It is particularly advantageous for the number of turns on the screw shaft or shafts at the delivery end in each case to be chosen to be equal to the number of planet gears of the gear pump connected thereto. However, the number of turns must in no way be constant over the entire screw length. In one embodiment, use of the gear pumps provides for the number of turns on the screw shafts in the section of the screw shafts lying upstream of the delivery end in each case to be chosen to be half as great as at the delivery end.

When a planet gear pump with oblique toothing is used, it is advantageous to provide the inclination of the spiral of the turns of the screw shafts in each case in the opposite direction to the inclination of the toothing, based on the delivery direction of the screw extruder.

In order to be able to effect the delivery capacity of the screw extruder having the planet gear pump without changing the drive speed, it is recommended to arrange the screw shaft to be displaceable axially, in each case together with the planet carrier and the sun wheel and the inlet and outlet sealing wall. As a result of axial displacement of the screw shaft, which is firmly connected mechanically to the planet carrier so as to rotate with it, the delivery capacity of the gear pump can be influenced in this way, since in the manner previously described, the displacement volume and/or the desired leakage between suction chamber and pressure chamber is controlled.

A substantial advantage in the case of the combination of a screw extruder with the gear pump is to be seen in the fact that, because of the good pressure build-up characteristic with the simultaneous lack of necessity for a noticeable delivery pressure in order to feed into the gear pump, the extruder screw upstream of the gear pump can be of very short design. The length of the extruder screw is preferably two to fifteen times the value of the screw diameter.

A particularly advantageous use of the planet gear pump results in a screw extruder in particular for processing rubber mixtures if, downstream of the gear pump, there is an extruder pin cylinder region, such as is disclosed for example by DE-40 39 942 A1, U.S. Pat. No. 4,127,741; the disclosure of which is hereby incorporated by reference. Therein, the planet gear pump can easily build up the high pilot pressure which is advantageous for the extruder pin cylinder region.

In a further advantageous application, provision is made for a vacuum degassing region also to be connected downstream of such an extruder pin cylinder region, being followed at the end of the extruder by a second planet gear pump in order to supply the required extrusion pressure at the extruder outlet.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF PRESENTLY PREFERRED EMBODIMENTS

Figure 1:
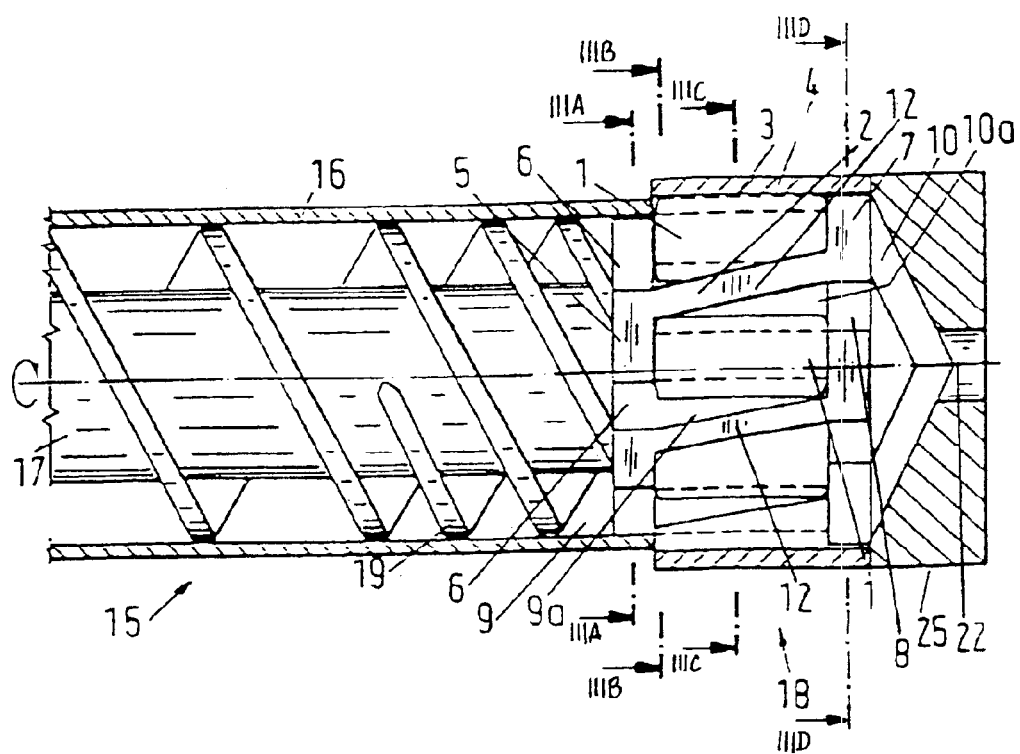
FIG. 1 is a longitudinal cross-sectional view through a single-screw extruder with planet gear pump.
Figure 2:
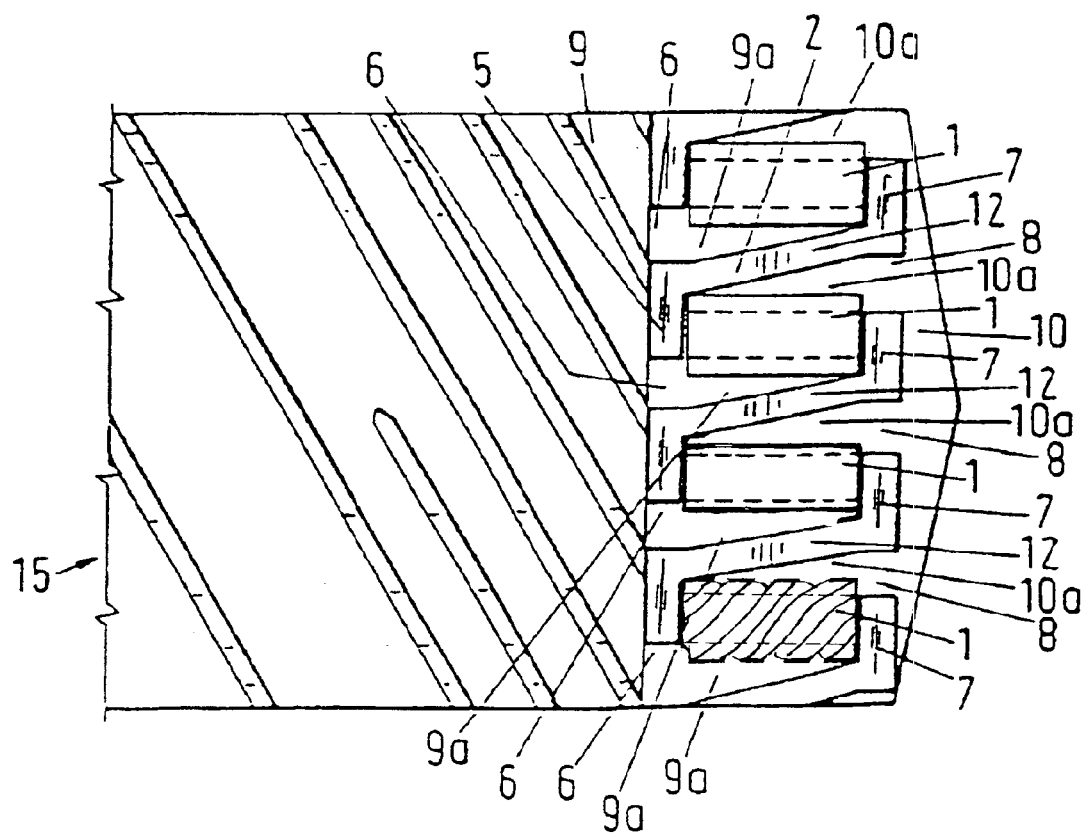
FIG. 2 is the longitudinal cross-sectional view corresponding to FIG. 1 of one embodiment.

In FIGS. 1 to 3d, a screw extruder 15 is illustrated in an axial longitudinal section, a number of cross-sectonal views and a schematic embodiment (FIG. 2). The screw extruder 15 has a screw shaft 17 which, viewed in the delivery direction, is initially of two-turn design and at the delivery end 19 has twice the number of turns, i.e. four turns. The screw shaft 17 is surrounded by an extruder casing 16.

Figure 3A:
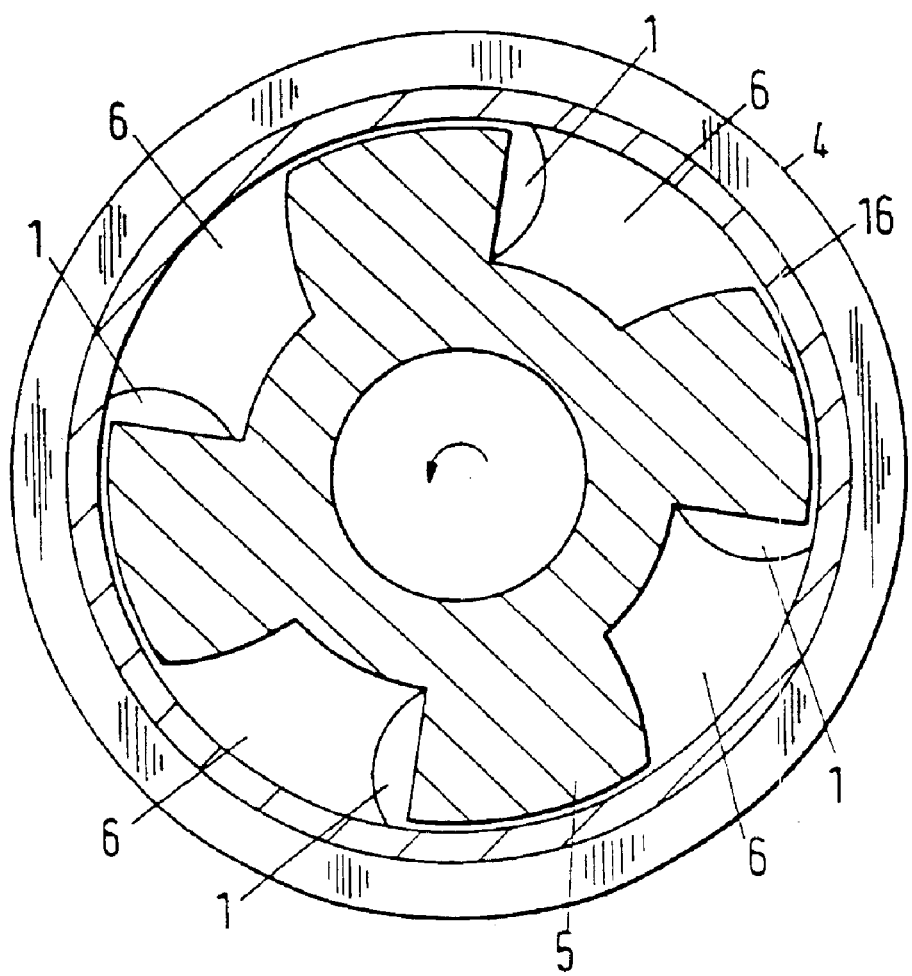
FIGS. 3.a–d are cross-sectional views according to section lines IIIA—IIIA, IIIB—IIIB, IIIC—IIIC, and IIID—IIID in FIG. 1.
Figure 3B:
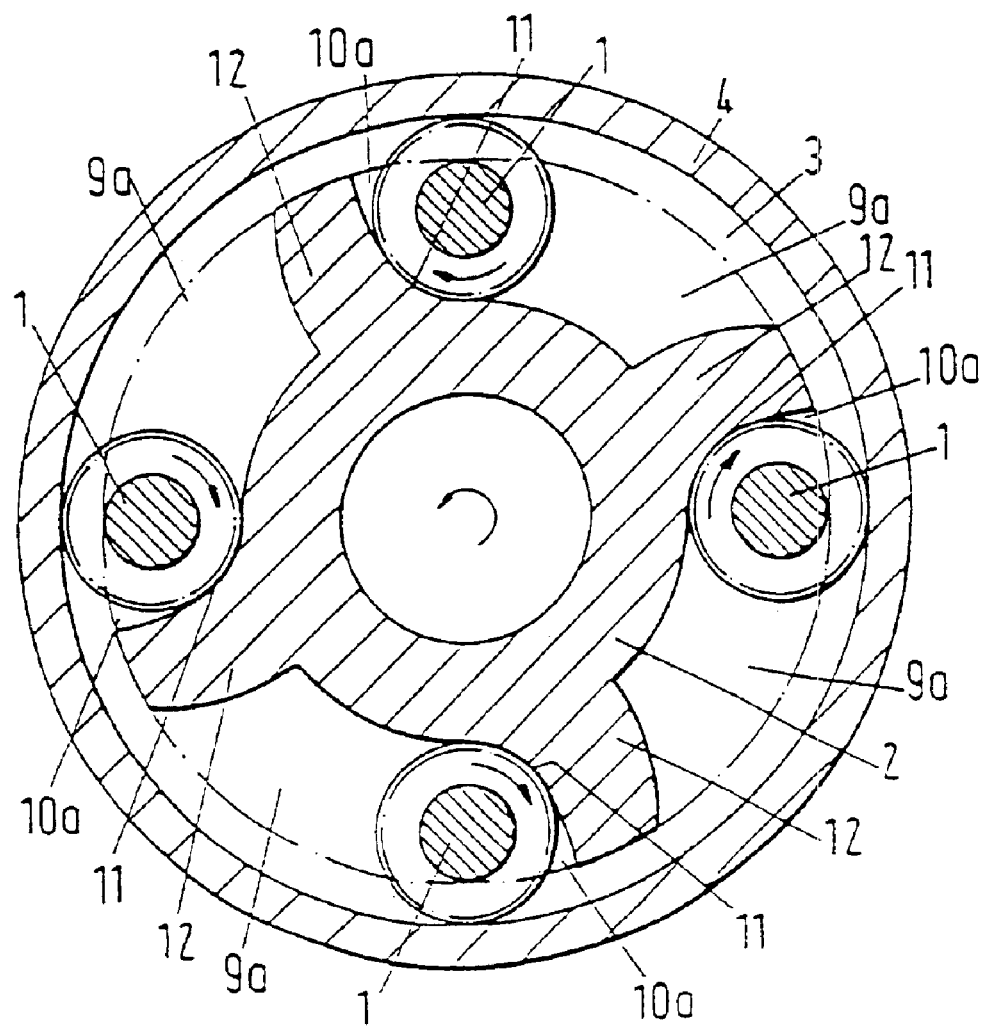
Figure 3C:
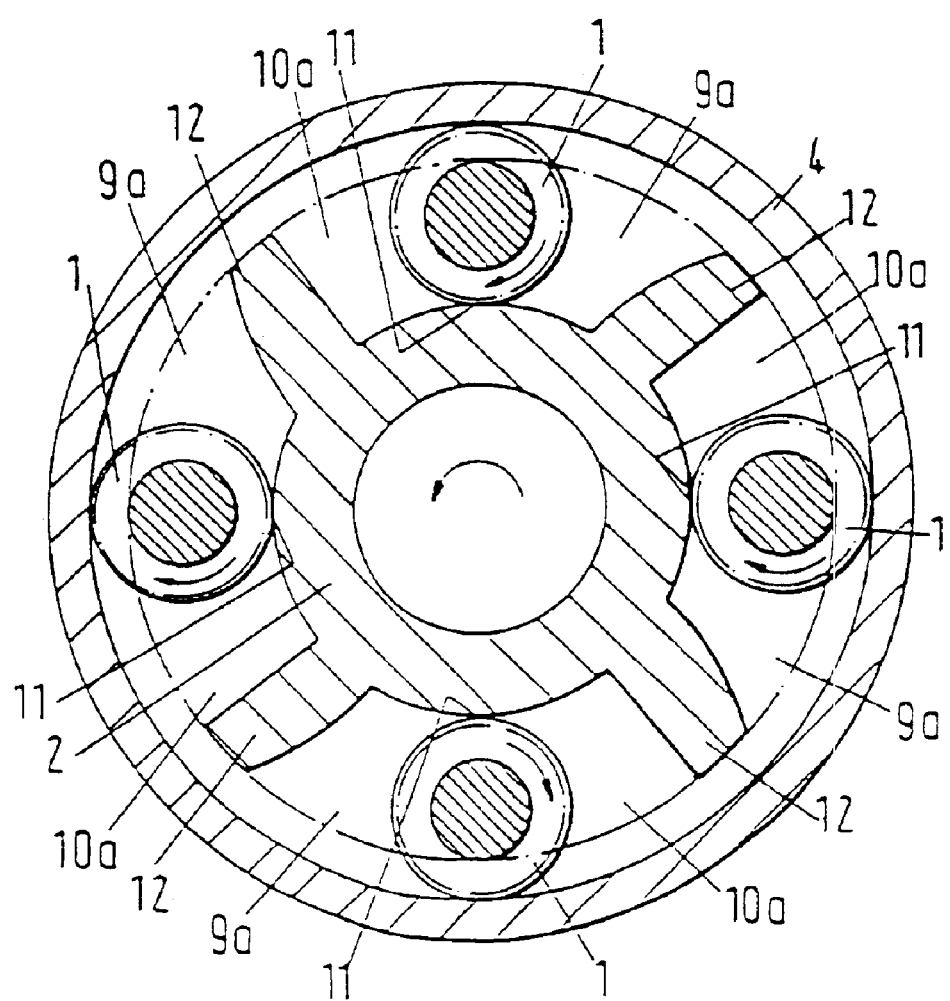
Figure 3D:
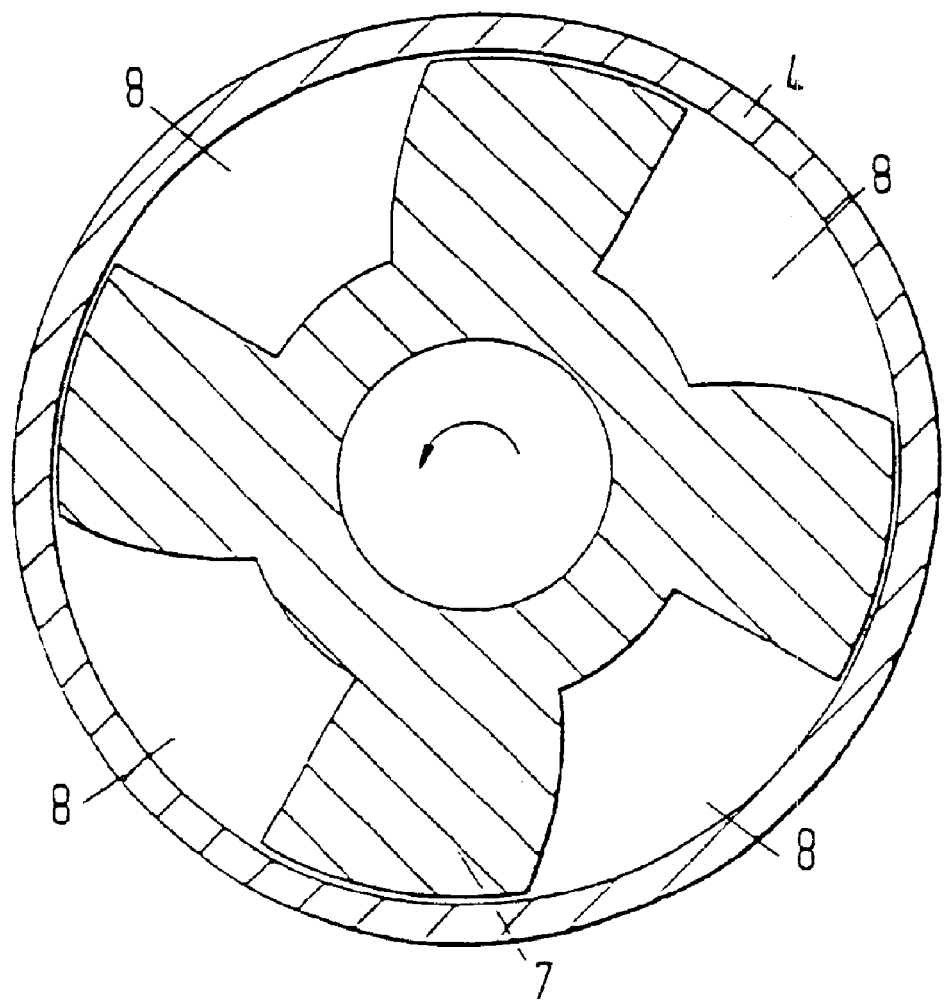

Immediately following the delivery end 19, a planet gear pump 18 is provided, which has a substantially cylindrical pump casing 4, within which a planet carrier 2 with four planet gears 1 rotatably mounted therein is arranged. Provided in the region of the wall of the pump casing 4, on the inside, is a toothed internal gear 3 which, in accordance with one embodiment of the present invention, is designed in one piece with this part of the pump casing 4. On the left-hand side of the planet gears 1 there is an inlet sealing wall 5, which is mounted in a sealed and rotatable manner in the extruder casing 16. This inlet sealing wall 5 is provided with four inlet openings 6, corresponding to the number of planet gears 1 (FIG. 3a). Arranged on the right-hand side of the planet gears 1 is an outlet sealing wall 7, which is provided in a corresponding way with four outlet openings 8 (FIG. 3d). The outlet sealing wall 7 is also rotatably mounted, to be specific in the pump casing 4. To the left of the inlet sealing wall 5, i.e. at the end of the four-turn part of the screw shaft 17, there is the suction chamber 9 of the gear pump 18, while its pressure chamber 10 is located on the right-hand side of the outlet sealing wall 7. The suction chamber 9 extends through the inlet openings 6 in the form of suction chamber elements 9a in each case along a planet gear 1 as far as the outlet sealing wall 7. In a corresponding way, on the diametrically opposite side of a planet gear 1, the pressure chamber 10 extends in the form of a pressure chamber element 10a in each case through the outlet openings 6 as far as the inlet sealing wall 5 (FIGS. 1, 3b, 3c). The planet carrier 2, to which in functional terms the inlet sealing wall 5 and the outlet sealing wall 7 also belong, since these accommodate the mounting of the planet gears 1, is provided with a total of four dividing walls 12, which extend substantially radially from a central basic body outward between the planet gears 1 as far as the toothing of the internal gear 3. FIG. 3b reveals that the planet gears 1, in each case in a sealing region 11 of smooth cylindrical shape, bear in a sliding and sealing manner on the respectively associated dividing walls 12 and the central basic body of the planet carrier 2. The sealing walls 12 are designed in one piece with the planet carrier 2. The planet gears 1 are engaged with the toothing of the internal gear 3, so that sealed contact is also provided there. Viewed incrosssection, therefore, the suction chamber elements 9a are in each case terminated by a dividing wall 12, the central basic body of the planet carrier 2, an associated planet gear 1, which bears in a sealing manner on the central basic body and the toothing of the internal gear 3, and by part of the internal gear 3.

Correspondingly, this is applicable to the pressure chamber elements 10a that are diametrically opposite the axis of the planet gears 1 and, in the illustrated sectional position of Fig. 3b, have only a very small cross section in the vicinity of the inlet sealing wall 5. The converse size relationships result when a corresponding section in the vicinity of the outlet sealing wall 7. There, the suction chamber elements 9a would have the size of the pressure chamber elements 10a in Fig. 3b. The cross section of the pressure chamber element 10a would accordingly have the size of the suction chamber element 9a in FIG. 3b. Thus, the suction chamber elements 9a decrease continually in cross-sectional area from the inlet opening 6 as far as the outlet sealing wall 7, while the opposite pressure chamber elements 10a increase continuously in cross section from the inlet sealing wall 5 as far as the outlet openings 8 in the outlet sealing wall 7. In the center between the inlet sealing wall 5 and the outlet sealing wall 7, the suction chamber elements 9a, as FIG. 3c shows, have a cross section of about the same size as the pressure chamber elements 10a.

The volume of the pressure chamber elements 10a could also be reduced down to zero as required in order to increase the self-cleaning capability of the planet gear pump 18, so that the dividing walls 12 would in each case bear in a sealing manner on the toothing of the respective planet gears 1, on the side lying opposite the suction chamber elements 9a, and the material to be delivered would pass directly from the tooth gaps of the toothing of the planet gears 1 and of the internal gear 3 through the outlet openings 8 into the pressure chamber 10.

While the central basic body of the planet carrier 2 which, in a conventional planet gear mechanism corresponds to the sun gear, has no toothing of any kind, the internal gear 3 is advantageously equipped with oblique toothing, just like the planet gears 1 (see, e.g., the lowest planet gear 1 in FIG. 2). Likewise, in one embodiment of the present invention, the dividing walls 12 are spiral shaped, that is to say set obliquely with respect to the longitudinal axis of the screw extruder 15, the inclination of this obliqueness pointing in the opposite direction to the inclination of the turns of the screw shaft 17 (FIG. 1). The outlet from the extruder illustrated is designated by the reference symbol 22.

The section of FIG. 1 reveals that the pump casing 4 has an enlarged diameter as compared with the extruder casing 16. The extruder casing 16 has an inner diameter which is slightly smaller than the diameter of the tip circle of the toothing of the internal gear 3, so that the right-hand end wall of the extruder casing 16 in the vicinity of the section IIIB—IIIB shown completely covers the cross-sectional areas of the tooth gaps of the toothing of the internal gear 3. The same applies to the tooth gaps of the planet gears 1 if the latter are located in the region of engagement with the toothing of the internal gear 3. Otherwise, the planet gears 1 and the entire intermediate space are closed completely by the inlet sealing wall 5, apart from the necessary inlet openings 6 (FIG. 3a).

The same is true on the other side of the planet gears 1 in relation to the outlet sealing wall 7 and the outlet openings 8 (FIG. 3d). The outlet sealing wall 7 has an outer diameter which corresponds to the inner diameter of the pump casing 4, so that the tooth gaps of the toothing of the internal gear 3 on the right-hand end of the toothing are sealed completely by the outlet sealing wall 7. Since the outer diameter of the inlet sealing wall 5 is deliberately chosen to be smaller than the tip circle diameter of the toothing of the internal gear 3, for the purpose of disassembly, after a top piece 25 has been removed, the entire unit of the planet carrier 2 with the planet gears 1 and the two sealing walls 5, 7 can be pulled to the right out of the pump casing 4 without difficulty.

The mode of operation of the screw extruder illustrated is as follows: the medium to be processed, for example the melt of a thermoplastic, is delivered from left to right in the direction of the gear pump 18 by the screw shaft 17. From the initially two part streams which move along the two-turn screw shaft, four part streams are produced at the delivery end 19 by the two additional screw turns. The screw turns in each case end, as emerges particularly clearly from the development of FIG. 2, as an inlet opening 6, that is to say open into a suction chamber element 9a. Since the screw shaft 17 is coupled mechanically to the planet carrier 2, the latter, together with the sealing walls 5, 7 likewise coupled thereto, carries out the same rotational movements.

The melt passes through the comparatively large inlet openings 6 into the individual suction chamber elements 9a, without a substantial pilot pressure being needed for this purpose. The material of the melt is swept through the dividing walls 12 into the tooth gaps in the toothing of the internal gear 3 in accordance with the direction of rotation shown. The conveyance of the melt into the respective opposite pressure chamber element 10a takes place in two part streams at each planet gear 1. One part stream is guided in the tooth gaps of the respective planet gear 1 along the sealing regions 11 into the associated pressure chamber element 10a, while a second mass flow is produced by the melt being squeezed out of the tooth gaps of the internal gear 3 because of the engagement of the toothing of the planet gears 1. In this way, the overall stream still consisting of four part streams is then divided up into a total of eight part streams, so that the planet gear pump can contribute to improving the mixing of the material. The fact that the material to be delivered is swept into the tooth gaps of the internal gear 3 by the radial dividing walls 12 as the planet carrier 2 revolves also results in this gear pump being particularly suitable for extensive self cleaning.

The inlet sealing wall 5 and therefore at least also part of the planet carrier 2 can also be a bodily constituent part of the screw shaft 17, that is to say do not have to be separate components.

Figure 4:
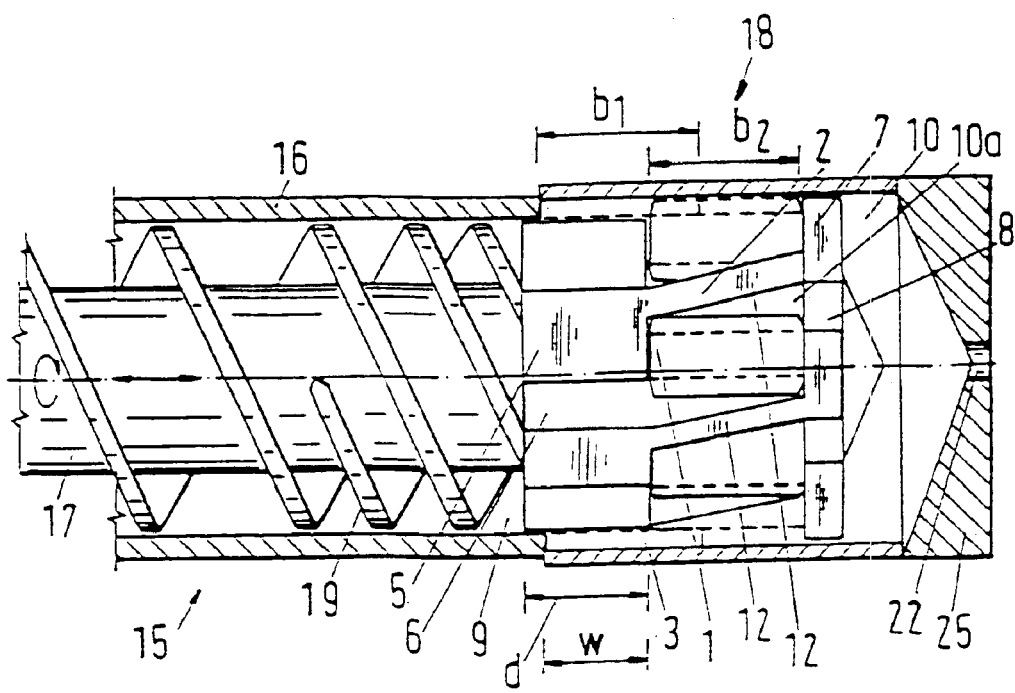
FIG. 4 is an embodiment of the screw extruder corresponding to FIG. 1 resulting from axial displacement of the screw shaft.

FIG. 4 illustrates a modification of the screw extruder with planet gear pump illustrated in FIGS. 1 to 3d. The fundamental construction and function of this screw extruder correspond to the last one, so that to this extent reference is made to the above description. However, as distinct from this, the screw shaft 17 of the screw extruder 15 in FIG. 4 can be displaced in the axial direction, together with the planet carrier 2 and the inlet sealing wall 5 and outlet sealing wall 7 connected thereto, as indicated by the thick double arrow shown on the longitudinal axis of the extruder. The tooth width of the internal gear 3 is designated $b_1$ and the tooth width of the planet gears is designated $b_2$. The two tooth widths $b_1$, $b_2$ are approximately equal, so that in an initial position (not shown), in which the screw shaft with the planet carrier 2 coupled mechanically thereto is displaced to the left (left-hand end position) both toothing widths $b_1$, $b_2$ are completely covered.

The displacement travel of the screw shaft 17 and of the planet carrier 2, which has occurred with respect to this initial position, is designated by w in FIG. 4. Thus, in the position shown (in the vicinity of the right-hand end position), the toothing is engaged only over a length $b_1-w$. The delivery volume of the gear pump 18 is accordingly reduced. Thus, the part stream of the delivered quantity led past the sealing regions 11 (FIGS. 3b, c) remains completely unaffected. The only part stream which is changed is the part mass stream caused by the displacement of the teeth of the planet gears 1 engaging in the tooth gaps of the internal gear 3. In order to prevent the axial displacement of the planet carrier 2 of the gear pump 18 causing an undesired leakage between the pressure chamber 10 and the suction chamber 9 in the region of the tooth gaps on the left-hand side of the internal gear 3, the thickness of the inlet sealing wall 5, which is designated d, is considerably greater than the thickness of the outlet sealing wall 7. In order to obtain the tightness, this thickness d must be at least slightly greater than the maximum displacement travel w, in order that the circumference of the inlet sealing wall 5, in spite of the displacement, continues to bear tightly on the smooth-walled inside of the extruder casing 16 or of a pump casing 4 extended in this region.

If this overlap of the inlet sealing wall 5 with the extruder casing 16 were not provided, a reverse flow from the pressure chamber 10 would be produced through those tooth gaps in the internal gear 3 which are currently not in engagement with the corresponding teeth of the planet gears 1. This reverse flow effect could, however, also be produced and controlled deliberately in order to regulate the delivery capacity of the pump. To this extent, the considerable enlargement of the thickness of the inlet sealing wall 5 is not absolutely necessary in order to maintain the functional capability of the gear pump 18 in spite of the displacement of the planet carrier 2 in the axial direction. In this way, the delivery capacity of the gear pump 18 can even be reduced much more substantially than is possible in the embodiment illustrated in FIG. 4.

Figure 5:
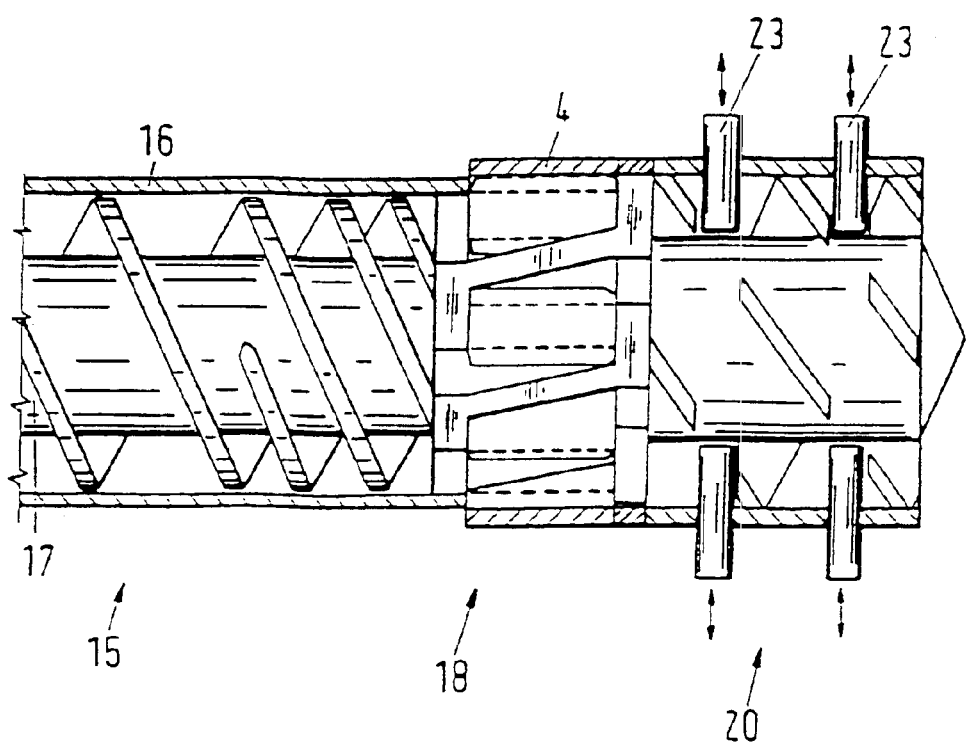
FIG. 5 is a screw extruder with planet gear pump and extruder pin cylinder region connected thereto.

FIG. 5 shows a similar arrangement of screw extruder 15 with gear pump 18, which is supplemented only by the feature that, in the delivery direction, which goes from left to right, an extruder pin cylinder region 20 is also connected downstream of the gear pump 18, such as is often used in particular for processing rubber mixtures. Pins 23 are inserted into the housing of the extruder pin cylinder region 20, as indicated by the double arrows, and can be set in the radial direction against the extruder longitudinal axis. In this case, the gear pump 18 ensures that there is still sufficient pressure for the extrusion of the processed material at the end of the extruder pin cylinder region 20.

Figure 6:
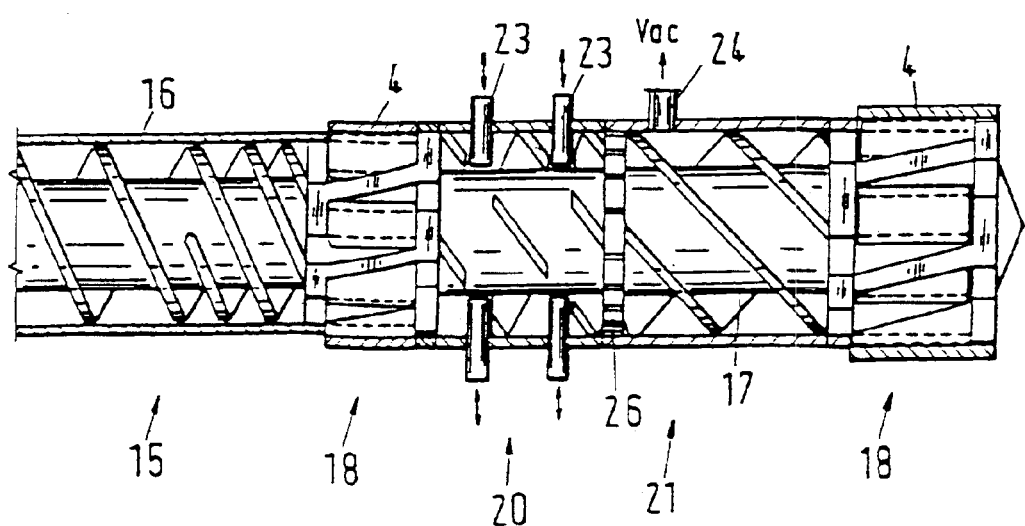
FIG. 6 is a screw extruder with two planet gear pumps connected one behind another, extruder pin cylinder region and vacuum degassing region.

In FIG. 6, the arrangement according to FIG. 5 is further extended by two further sections. To be specific, the extruder pin cylinder region 20 is firstly adjoined in the delivery direction by a vacuum degassing region 21 having a vacuum connection 24 and passages 26 on the inlet side, and also by a four-turn screw shaft 17, while at the extrusion end, that is to say at the right-hand end of the arrangement, a second gear pump 18 is also connected, which produces the delivery pressure desired for extrusion of the processed melt. In this arrangement, by means of volumetric delivery through the two gear pumps 18, decoupling of the build-up length and extrusion pressure is made possible, so that flooding of the vacuum extraction in the vacuum degassing region 21 can be avoided.

Figure 7:
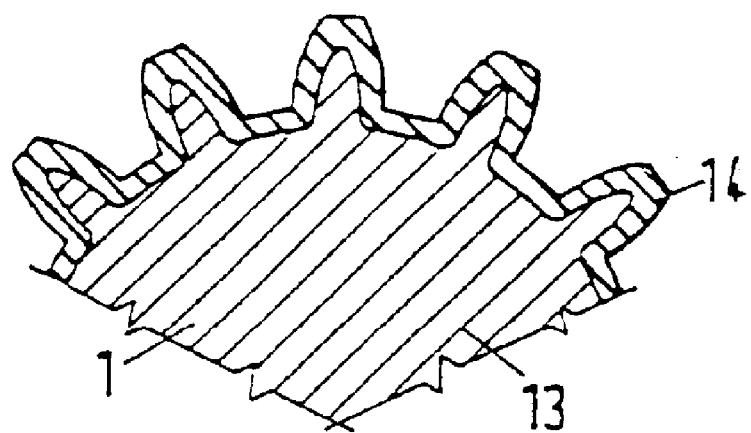
FIG. 7 is a cross-sectional view of a planet gear with soft elastic covering.

For the toothing of the internal gear 3 (or the toothing of the sun gear in the case of a converse pump arrangement) and/or the toothing of the planet gears 1, it is possible to select an embodiment as illustrated in FIG. 7 as an example and schematically as a part section of a planet gear 1. This planet gear 1 has a basic gear body 13 which is preferably produced from metal (for example steel) and in production terms can be toleranced relatively coarsely in relation to the toothing. The individual teeth are substantially smaller and the tooth gaps are substantially larger than is intended for the final shape of the planet gear 1. This final shape is produced by a covering of a soft elastic material 14 (for example rubber or a thermoplastic elastomer). Because of the good deformability of this material, the accuracy of shape of the finished planet gear 1 does not have to be so high as would have to be the case with a rigid material, since oversizes of the tooth geometry can be compensated for by deformation during the tooth engagement. Because of the lower requirements on the accuracy of shape, the production expenditure for the toothing can be reduced accordingly. On the other hand, in this way particularly high requirements on the tightness of the toothing which is in engagement with regard to an undesired reverse flow of material can also be met.

Figure 8:
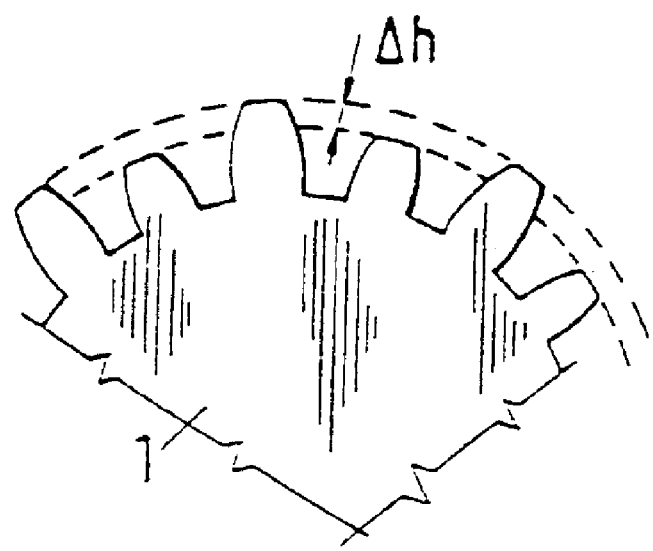
FIG. 8 is a planet gear with teeth of alternately different heights.

In FIG. 8, a further variation with regard to the toothing that can be used is again indicated schematically using the example of a planet gear 1, which is illustrated as a detail. This planet gear 1 has teeth with alterately different heights. The difference in the teeth height is designated by $\Delta h$. In this case, each second tooth has a lower tooth height than the normal tooth height. Alternatively, a plurality of teeth one after another could in each case have the same height, so that the tooth height would change in areas over the circumference. It is also possible to use planet gears 1 which have the same tooth height but mutually different tooth heights between the two planet gears (e.g., the second planet gear from the bottom in FIG. 2 has a smaller tooth height than the other planet gears.

A particular effect to be achieved is compaction of the material in a tooth gap in the internal gear 3, which is acted on by a tooth with a reduced tooth height and, as a result, is at most conveyed partly out of the tooth gap into the pressure chamber 10. As a result of another tooth with a normal tooth height penetrating into such a tooth gap during the further revolution of the planet carrier, this compacted material could then be delivered into the pressure chamber.

The gear pump of the present invention ensures that during empty running of an extruder equipped with such a gear pump, virtually the entire melt material is delivered out of the extruder and the gear pump connected thereto, since virtually no pilot pressure is required to ensure the feed of material into the gear pump. In this way, in most cases complicated cleaning work when changing the material to be processed may be avoided. Added to this is the fact that, because of the division of the material flows at each planet gear into two smaller part flows, this gear pump has a considerably better mixing action on the material to be processed than is the case in a conventional gear pump used as a melt pump and having the design of a spur gear mechanism. There, only two material part streams are produced and led together again. In the gear pumps illustrated in the figures, which are each equipped with four planet gears, eight part streams are produced in the melt flow and led together again. As a result, significantly better material mixing is ensured. By means of simple mechanical coupling of the planet carrier to the screw shaft of an extruder, it is possible to dispense completely with a separate motor drive for the gear pump. Nevertheless, regulation of the delivery capacity of the gear pump is possible if the latter is set up for axial adjustment, as has been described above.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed from or embodiment of the invention may be incorporated in any other disclosed or described or suggested from or embodiment as a general matter of design choice. It is the intention, therefore, to be limited only as indicated by the scope of the claims appended hereto.

The invention relates to a screw extruder and gear pump arrangement for highly viscous media, in particular for plastic melts and rubber mixtures, having one or more screw shafts and gear pump which, in drive terms, is coupled mechanically to the screw shaft or shafts and whose pump is causing is a constituent part of the casing of the screw extruder or is connected directly thereto.

What is claimed is:

1. A screw extruder and gear pump arrangement for highly viscous media comprising:
   a screw shaft rotatably mounted in an extruder casing;
   a planet carrier carrying at least one rotatably mounted planet gear;
   a pump casing fixed to the extruder casing and surrounding the planet carrier;
   a first functional element cooperatively engaged with the at least one planet gear as a sun wheel;
   a second functional element cooperatively engaged with the at least one planet gear as an outer ring;
   only one of the functional elements having gear teeth which mesh with the at least one planet gear, the other functional element comprising a smooth-walled sealing region which bears in a sliding and sealing manner over the length and part of the circumference of the planet gear, the other functional element being fixed to the planet carrier;
   an inlet sealing wall fixed to the planet carrier, the inlet sealing wall rotating with the planet carrier and having at least one inlet opening for passing a medium to be delivered;
   an outlet sealing wall firmly connected to the planet carrier, the outlet sealing wall rotating with the planet carrier and having at least one outlet opening for passing a medium to be delivered;
   a suction chamber arranged upstream of the inlet sealing wall in a delivery direction and extending through the inlet opening into at least one suction chamber element along a respective at least one said planet gear to the outlet sealing wall;
   a pressure chamber enclosed by the pump casing, the pressure chamber arranged downstream of the outlet sealing wall in the delivery direction;
   at least one dividing wall extending from the inlet sealing wall to the outlet sealing wall, circumferentially offset from a respective said planet gear and separating a respective at least one suction chamber element from the pressure chamber, each said dividing wall being fixed to the functional element comprising a sealing region for bearing in a sliding and sealing manner over the length part of the circumference of the planet gear, and extending in the radial direction to the outer diameter of the gear teeth of the functional element comprising gear teeth for meshing with the planet gear.

2. The screw extruder and gear pump arrangement of claim 1 wherein the pressure chamber extends through the outlet opening into a pressure chamber element along the planet gear to the inlet sealing wall, each said dividing wall separating a respective said suction chamber element from a respective said pressure chamber element.

3. The screw extruder and gear pump arrangement of claim 1 wherein the dividing wall bears sealingly and circumferentially over the entire axial length of the planet gear.

4. The screw extruder and gear pump arrangement of claim 1 comprising at least two said planet gears, at least two said dividing walls, at least two said inlet openings, and at least two said outlet openings.

5. The screw extruder and gear pump arrangement of claim 1,
   wherein each said planet gear comprises oblique gear teeth; and
   wherein the gear teeth of the one of the functional elements are oblique gear teeth.

6. The screw extruder and gear pump arrangement of claim 5, wherein the dividing wall spirals concordantly with the oblique gear teeth in the axial direction.

7. The screw extruder and gear pump arrangement of claim 1, wherein the dividing wall and the one of the functional elements comprising a sealing region for bearing in a sliding and sealing manner over the length and part of the circumference of the planet gear are one piece.

8. The screw extruder and gear pump arrangement of claim 1 wherein the outer ring includes an internal gear comprising gear teeth and the first functional element is provided with the at least one sealing region.

9. The screw extruder and gear pump arrangement of claim 8, wherein the planet carrier and the first functional element are one piece.

10. The screw extruder and gear pump arrangement of claim 8, wherein the inlet sealing wall and the planet carrier are one piece.

11. The screw extruder and gear pump arrangement of claim 8, wherein the outlet sealing wall and the planet carrier are one piece.

12. The screw extruder and gear pump arrangement of claim 8, wherein the internal gear and a first portion of the pump casing are one piece, the first portion of the pump casing surrounding the internal gear.

13. The screw extruder and gear pump arrangement of claim 8, wherein the outer diameter of the inlet sealing wall is less than the outer diameter of the outlet sealing wall.

14. The screw extruder and gear pump arrangement of claim 8, wherein the pump casing comprises the planet carrier, the first functional element, the inlet sealing wall and the outlet sealing wall for changing the delivery volume of the gear pump, the planet carrier, the first functional element, the inlet sealing wall and the outlet sealing wall axially displaceable by a displacement travel with respect to the internal gear.

15. The screw extruder and gear pump arrangement of claim 14, wherein the inlet sealing wall has a thickness in the displacement direction which is greater than the maximum displacement travel.

16. The screw extruder and gear pump arrangement claim 1, wherein the planet gear or the functional element comprising gear teeth for meshing with the planet gear is made of a soft elastic material on at least part of the gear teeth.

17. The screw extruder and gear pump arrangement of claim 16, wherein the planet gear or the functional element comprising gear teeth for meshing with the planet gear includes a metallic basic gear body and an elastic covering in a region of the gear teeth, the elastic covering comprising rubber or a thermoplastic elastomer.

18. The screw extruder and gear pump arrangement of claim 1, wherein the one of the functional elements or the planet gear comprises gear teeth of different height, the height differing sequentially or in a pattern.

19. The screw extruder and gear pump arrangement of claim 4 wherein the height of the gear teeth of one said planet gear differs from the height of the gear teeth of another said planet gear.

20. The screw extruder and gear pump arrangement of claim 1, wherein the screw shaft comprises a delivery end provided with turns, the number of turns being equal to the number of planet gears.

21. The screw extruder and gear pump arrangement of claim 20, wherein the number of turns remote from the delivery and is half the number of turns disposed in the delivery end.

22. The screw extruder and gear pump arrangement of claim 21, wherein
- the gear teeth are oblique to form a first surface for cooperating with the screw shaft, and
- the screw shaft comprises a spiral inclination of the turns determined by the delivery direction, the direction of inclination of the screw shaft being opposite the direction of inclination of the gear teeth.

23. The screw extruder and gear pump arrangement of claim 1, wherein the screw shaft is axially displaceable in cooperation with the planet carrier, the second functional element, the inlet sealing wall, and the outlet sealing wall.

24. The screw extruder and gear pump arrangement of claim 1, further comprising an extruder pin cylinder region disposed downstream of the gear pump in the delivery direction.

25. The screw extruder and gear pump arrangement of claim 24, further comprising a vacuum degassing region proximal to the extruder pin cylinder region and a second gear pump, the first and second gear pumps arranged axially and sequentially on the screw shaft, the second gear pump disposed proximally downstream of the vacuum degassing region.

* * * * *